Aug. 26, 1958  H. D. EVANS  2,849,079
CYCLONE WITH DRAINED PLATE
Filed Jan. 25, 1957

INVENTOR
HARRY D. EVANS
BY *Oswald H. Milmore*
HIS ATTORNEY

United States Patent Office 2,849,079
Patented Aug. 26, 1958

2,849,079

CYCLONE WITH DRAINED PLATE

Harry D. Evans, Oakland, Calif., assignor to Shell Development Company, New York, N. Y., a corporation of Delaware Application January 25, 1957, Serial No. 636,433

12 Claims. (Cl. 183—85)

The invention relates to stationary cyclone separators, herein called cyclones, for the centrifugal separation of suspended liquid from a gas containing the same (the term "gas" being used generically herein to include vapor). It finds especial, although not exclusive, application in the separation of liquid drops from vapors in equilibrium with the liquid, e. g., in the treatment of petroleum oil streams that have been heated to vaporize certain constituents, with or without cracking, by a flashing operation.

Cyclones of the type considered herein include an enclosed centrifugation chamber that is shaped as a surface of revolution and to which the suspension to be separated is charged in a flow direction to cause circumferential or vortical motion of the suspension, thereby concentrating the liquid drops near the chamber wall and coalescing the liquid on the wall to create near the axis of rotation a core of gas which is essentially freed from liquid; such cyclones are provided with an overflow outlet, usually a central exit tube open at the bottom and extending out through the top closure, for the discharge of the gas from said core, and with an underflow outlet in the bottom closure for the separated liquid.

The effectiveness of such cyclones is severely limited by the entrainment of liquid drops in the emerging gas stream, caused largely by pickup of drops that have already been concentrated near or coalesced on the chamber wall and/or in the bottom closure. For example, when an upright cyclone having a downwardly convergent bottom closure (e. g., frusto-conical or hemispherical) is used to separate liquid from gas, a considerable quantity of separated and coalesced liquid is present on the side wall of the chamber and on the wall of the bottom closure. A part of this liquid is re-entrained by the gas vortex, wherein a reduced pressure prevails, and pickup is particularly severe at the place where the gas reverses direction and sweeps the bottom closure in moving toward the overflow exit tube. This results in undesirable entrainment of liquid in the emerging gas stream. Similar difficulties arise in cyclones of other, e. g., spherical outlines, to which this invention is also applicable.

It has been proposed to reduce entrainment from the bottom closure by mounting a horizontal disc or bottom plate beneath and in spaced relation to the entrance opening of the overflow exit tube and above the underflow outlet in the bottom closure. However, tests have shown that an appreciable quantity of liquid is (1) deposited on the upper surface of such a plate, (2) swept to the center of the plate by the strong radial inflow of gas in this region and (3) entrained in the effluent gas. Further, the presence of such liquid on the plate results in undesired chemical reactions; e. g., in treating hydrocarbon oils at elevated temperatures, cracking and deposition of carbonaceous matter are apt to ccur.

Moreover, the pressure drop of the fluid through the cyclone is greatly affected by the flow patterns of the gas and probably also by the re-entrainment of separated liquid, as described above.

It is a general object of the invention to improve the effectiveness of cyclones and reduce the entrainment of separated liquid in the effluent by means of an improved bottom plate construction. Ancillary thereto, it is one specific object to overcome the above-noted drawbacks of prior bottom plates by providing a liquid removal means, specifically a drain, to reduce the accumulation and retention of liquid on the plate.

Other specific objects are to provide closure vortex-breaker blades in the bottom closure beneath the bottom plate disposed so as to cause a beneficial alteration in the fluid flow patterns in the cyclone and thereby reduced entrainment and the pressure drop through the cyclone. Further, it is an object to provide such vortex-breaker blades in combination with a drained bottom plate so as to reduce the pressure difference between the regions above and beneath the plate, thereby reducing the head required to seal the drain pipe from the plate and reducing the liquid holdup in the cyclone.

In summary, according to the invention, the cyclone is provided with a horizontal bottom plate situated beneath the overflow outlet and spaced both vertically and peripherally from the enclosing cyclone wall to permit liquid flow downwards about the plate and thence beneath it to the underflow outlet, said plate having an opening connected to a drain pipe that discharges into the underflow outlet through a liquid seal, whereby the upflow of gas through the drain pipe is prevented. One or more plate vortex-breaker vanes and/or a restricted inlet, e. g., shaped as a slot, may be provided at the said opening in the bottom plate.

The bottom plate advantageously has a diameter at least as great as that of the underflow outlet; moreover, the plate diameter is preferably at least half the diameter of the enclosing wall at the plate level.

A further feature of the invention is the use of a downwardly convergent bottom closure forming the lower part of the centrifugation chamber wall in combination with a bottom plate mounted therein in spaced relation to the wall and above the underflow opening as described above, and closure vortex-breaker blades fixed within the bottom closure beneath the plate, the blades extending peripherally beyond the margin of the bottom plate and, thence, above the level thereof in the close vicinity of the closure wall (either sealed thereto or with a slight clearance). The inner edges of the blades may but need not be joined at the cyclone axis. When the blades are not radial they are advantageously inclined in the downstream direction with respect to the local radial planes so as to deflect the fluid toward the center, it having been found that inclination of the blades in the upstream direction forms undesirable eddy currents. A useful and desirable feature of the closure vortex-breaker blades in those installations wherein the downwardly convergent bottom closure is joined to the bottom of a substantially tubular enclosing wall is that they extend throughout the major and, preferably, at least the full axial extent of the closure; in such case they preferably have upper edges that slope from the vicinity of the juncture of the bottom closure and the said tubular wall downwardly and toward the chamber axis to the plate margin. Optimum results are attained when the said upper edges of the blades extend under the bottom plate in spaced relation thereto at least at the central region of the plate throughout a major part of the diameter thereof.

Having thus described the general purpose and nature of the invention, a more detailed description will be made with reference to the accompanying drawings forming a part of this specification and showing certain preferred embodiments, wherein:

Figure 1 is a vertical sectional view of an upright cyclone constructed in accordance with the invention;

Figures 2 and 3 are horizontal sectional views taken on the lines 2—2 and 3—3, respectively, of Figure 1;

Figure 1:
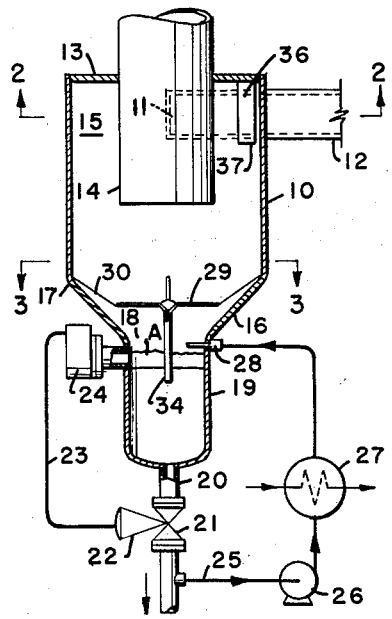

Referring to Figures 1–5, the cyclone includes an enclosing wall defining a centrifugation chamber and including: a cylindrical side wall 10 having near the top thereof a rectangular inlet opening 11 to which is connected a rectangular inlet duct 12 disposed to admit the suspension tangentially to the wall 10; a top closure 13 through which extends a central, tubular overflow exit duct 14 having a diameter less than the side wall so as to provide an annular clearance space 15; and a bottom closure 16 which is joined to the bottom of the side wall at a peripheral juncture line 17, sometimes known in the art as the tangent line, and which converges downwards from said line toward the central axis. The exit duct 14 may extend to a level somewhat below the bottom of the inlet opening 11, as shown, and has an open lower end which constitutes the entrance to the overflow outlet. It should be understood that while a conical bottom closure was illustrated the invention is not limited thereto. An underflow outlet is provided at the bottom and includes an opening 18 at the lowest part of the bottom closure, a sump 19, and a liquid-drawoff pipe 20.

A body of liquid is maintained within the sump 19 by means of a flow control valve 21 in the drawoff pipe 20. This valve is provided with a suitable operating element 22 controlled via a control line 23 by a liquid-level controller 24 which maintains liquid at the level A, somewhat below the opening 18. When dealing with heat-sensitive liquids, such as hydrocarbon oils at elevated temperatures, it is desirable to quench the liquid within the sump 19 or just prior to entry into the sump by injecting a coolant into a lower part of the cyclone. For example, a part of the effluent from the pipe 20 may be passed by a pipe 25 and pump 26 through a cooler 27 and injected through a nozzle 28 into the cycline above the level A. The coolant may also be introduced farther up, as described by van 'T Spijker in U. S. Patent No. 2,796,389, granted June 18, 1957.

The bottom closure contains a flat, circular bottom plate 29 which has a diameter which is greater than that of the underflow opening 18; the plate also preferably is greater than half the diameter of the enclosing wall at the plate level but is peripherally spaced therefrom to permit liquid to flow down about the edge of the plate through the intervening annular passage. In most cases it is also preferred to have the plate diameter at least as great as that of the entrance to the overflow duct 14, as shown. It is advantageous to locate the plate 29 below the juncture line 17 by a distance at least one-fourth of the height of the bottom closure.

The bottom plate is conveniently supported by a plurality of closure vortex-breaker blades 30, which are mounted generally upright, e. g., vertically as shown, and have their outer edges conformed generally to the contour of the bottom closure and located in the close vicinity thereof. The blades extend beneath the plate 30 in engagement therewith and laterally beyond the margin thereof and thence upwards above the top of the plate; their sloping upper edges 31 preferably reach at least to the level of the juncture line 17, e. g., slightly above that level as shown. The blades extend downwards preferably at least as far as the opening 18; for the greatest reduction in eddy currents the blades extend into the liquid in the sump to a level beneath the level A, as shown, to form sump vortex-breaker vanes. It is not essential that the outer edges of the blades be sealed to the closure wall and slight clearances are not detrimental; large clearances, about one-fourth inch, were however found to decrease the effectiveness of these blades. The blades extend from the closure wall generally toward the axis, e. g., radially as shown to the drain pipe 34, described presently.

The bottom plate 29 is formed with a central hole 32, the diameter of which is preferably not over one-third of the diameter of the plate. The edge of the hole is fitted to an axial drain pipe which includes a frusto-conical funnel section 33 and a cylindrical section 34 which extends into the underflow outlet so as to discharge liquid into the latter and provide a liquid seal. As shown, the open lower end of the section 34 is beneath the liquid level A by a distance sufficient to prevent the upflow of gas through the drain pipe, as described more particularly hereinafter. Optionally, the plate is provided with a small plate vortex-breaker vane 35 the height above the plate and the length of which are preferably not over one-third the diameter of the plate and which advantageously has an arcuate upper edge, as shown. The vane 35 extends down into the frusto-conical section 33.

Figure 2:
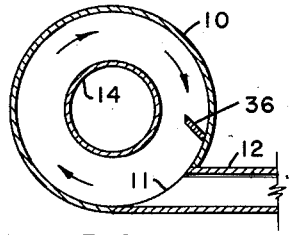
Figure 3:
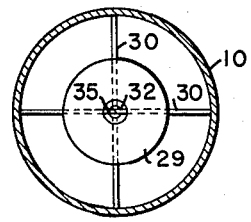
Figure 4:
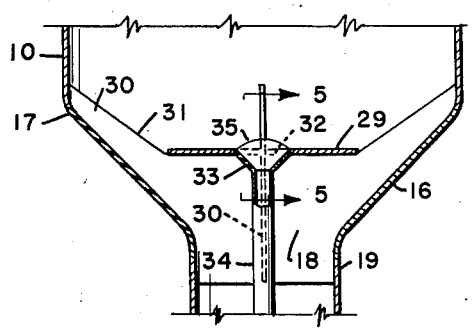
Figure 4 is an enlarged vertical sectional view of the lower part of the cyclone of Figure 1.

The centrifugation chamber may, if desired, be advantageously provided with an upright baffle 36 which is fixed to the side wall 10 along a line which is generally parallel to the chamber axis and situated close to the inlet opening 11 at the upstream side thereof with respect to the circumferential direction of fluid motion as shown by the arrows in Figure 2. The plate is advantageously inclined in the upstream direction with respect to the local radial axial plane, as shown, to form a pocket and for best results extends into the clearance space 15 through a distance equal to about half the radial dimension of said space, although other distances, e. g., from 0.2 to 0.6 of said radial dimension, may be used. The plate, in the preferred construction, has the upper extremity thereof adjacent to the end closure 13, even when, as in the case illustrated, the inlet opening 11 is spaced from this closure; it extends to a lower edge 37 that is situated close to the level of the bottom of the opening 11.

As employed, for example, for separating liquid from a gas in which it is dispersed as small droplets, the suspension is charged into the chamber through the inlet duct 12 and forms a vortex moving in the direction of the arrows. The suspended liquid is flung against the chamber wall by centrifugal force and there coalesces to form a thick film that is carried about the wall by the gas and descends with a helix-like motion into the closure, wherein the circumferential motion of the liquid is arrested by the blades 30 and from which the liquid flows through the opening 18 into the sump 19 and drawoff pipe 20. The discharge rate is controlled by the valve 21 which is operated by the level controller 24 to maintain the liquid at the level A within the sump, so as to keep the bottom of the drain pipe 34 immersed and form a liquid seal. The liquid seal should be great enough to prevent the upflow of gas through this pipe, a flow which would occur without such a liquid seal because the pressure in the center of the gas vortex above the hole 32 is less than the gas pressure below the plate 29. Such a flow would carry liquid into the effluent gas, which ascends through the overflow exit duct 14, after having flowed with a gyratory motion from the space 15 downwards to the lower end of the tube 14 and thence inwardly over the bottom plate 29.

The plate 29 separates the radially flowing gas above it from the separated liquid beneath it and thereby reduces re-entrainment of separated liquid in the effluent gas stream, especially at high flow velocities. Some liquid is, nevertheless, swept over the top of the plate by the gas stream, usually with a spiral movement. A significant part of this liquid enters the hole 32 and flows through the drain pipe 33 into the underflow outlet, thereby increasing the effectiveness of the plate 29. The plate vortex-breaker vane 35 promotes entry of liquid into the hole 32 by reducing the rotary gas motion at the axis and thus interfering with the ascension of the liquid from the center of the plate, which has been observed to occur as an axial twisted column or filament of liquid. The vane further aids in collecting liquid by providing a coalescing surface for liquid that is carried by the gas. The part of the vane within the frusto-conical section or funnel 33 restricts gyratory gas currents therein and thereby reduces re-entrainment of liquid.

The closure vortex-breaker blades 30 reduce the gyratory movement of separated liquid along the closure wall and beneath the plate 29 and thereby promote more rapid discharge of liquid into the sump 19. By extending the blades to above the level of the plate the liquid is made to flow down more rapidly. A particularly beneficial effect of the use of the blades in combination with the plate is the reduction in pressure difference between the spaces above and below the plate 29. This effect is the result of a reduction in the rate of change of angular momentum of the gaseous stream, which lowers the overall pressure drop between the inlet and the overflow exit and also the local pressure gradients. This reduction in pressure difference across the plate 29 makes it possible to use a smaller head of liquid in the sump 19 for sealing the drain pipe 34 against upflow of gas and thereby reduces the liquid holdup in the cyclone.

Liquid holdup in the cyclone is detrimental in many instances, as then a heat-sensitive material, such as a petroleum oil, is treated at elevated temperature. The construction just described tends to reduce this holdup. Moreover, detrimental effects are further counteracted by injecting a coolant into the sump through the nozzle 28.

The inlet baffles plate 36 prevents liquid moving around the upper part of the wall 10 from being swept past the opening 11 and into the path of the entering dispersion. This reduces re-entrainment of separated liquid. By suitably locating the lower edge 37 of this baffle close to the level of the bottom of the opening 11 it presents a minimum obstruction to the helical flow of the gas.

Figure 6:
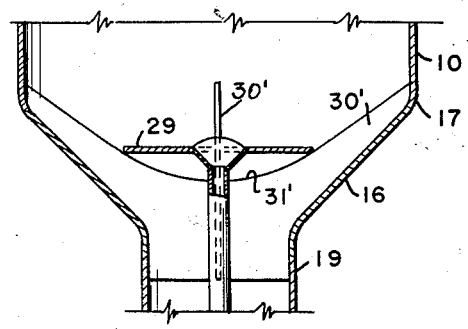
Figure 6 is a vertical sectional view of the lower part of an upright cyclone showing a modified arrangement of the closure vortex-breaker baffles.
Figure 5:
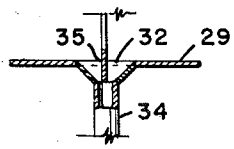
Figure 5 is a vertical sectional view taken on the line 5—5 of Figure 4.

Referring to Figure 6, there is shown a variant wherein the closure vortex-breaker blades 30' have curved upper edges 31' which are in spaced relation beneath the bottom plate 29 over most of the plate area and are in supporting relation of the plate only at the margins thereof. This construction was found under certain conditions to result in reduced entrainment and pressure drop across the plate. Other reference numbers denote parts described above for the first embodiment.

Figure 7:
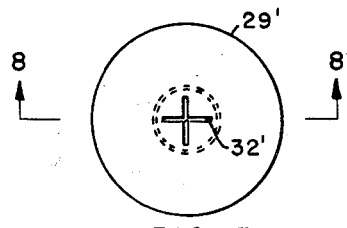
Figure 7 is a plan view taken of a bottom plate showing a further modification.
Figure 8:
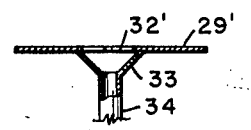
Figure 8 is a vertical sectional view of the plate and drain taken on the line 8—8 of Figure 7.

Referring to Figures 7 and 8, the bottom plate 29' has the central hole in the form of a plurality of radial slots 32' which communicate with the funnel section 33 of the drain pipe. In this arrangement the ascension of liquid from the plate with the gas is reduced by isolating the liquid as rapidly as possible from the influence of the rotating gas. As the liquid sweeps across the plate and crosses the slots it falls into the funnel section, within which the liquid is protected from strong gas currents.

*Example*

A cyclone having a spherical enclosing wall, a flat annular top closure or roof plate therein situated below the equator and sealed about a central, vertical, cylindrical gas-exit duct, a circular tangential inlet duct connected above the level of the bottom of the gas-exit tube, and a central underflow outlet at the bottom communicating with a sump was tested with various models of internal arrangements as described below. The sphere had a diameter of 17.5", the tangential inlet duct a diameter of 2.5", the gas-exit duct a diameter of 10.5", and the roof plate was located 1.7" below the equator.

The gas-exit tube had an open lower end situated 3.0" below the roof plate, leaving about 2.5" clearance above the lower cyclone wall. The top of the gas-exit tube, just above the equator, had a horizontal plate containing a multitude of openings connected to smaller riser tubes. The sump diameter was 2.5". All models considered below had four crescent shaped closure vortex-breaker blades 1" high at the bottom and tapering to points at about the level of the bottom of the gas-exit tube (except as noted for Model C). The models were:

*Model A.*—A small 4" diameter bottom plate mounted 2" above the bottom (about 2.2 inches below the gas-exit tube).

*Model B.*—Same as Model A, but with the 4" plate replaced by a 10.5" diameter plate.

*Model C.*—Same as Model B, but with the closure vortex-breaker blades cut flush with the level of the top of the bottom plate.

*Model D.*—Same as Model B, but with reverse baffle upstream from the inlet, corresponding to the baffle plate 36 in Figure 1 and 2.

*Model E.*—Same as Model A, but with the 4" plate replaced by a 10.5" diameter conical plate having an apex angle of 158.5° and mounted with the apex downward, and connected to a .25" drain pipe which extended into the sump. The cyclone further had a reverse baffle as in Model D.

*Model F.*—Same as Model D, but with a 3" opening in the center of the bottom plate connected to a funnel-shaped section and a .25" drain pipe which extended into the sump.

*Model G.*—Same as Model F, but with a slotted plate covering the opening, the slots being cruciform as shown in Figure 7.

All models were tested by admitting from the same source a suspension of 0.38 part by weight of water to one part of air, and each model was tested at three inlet velocities, 160, 220 and 280 feet per second, as indicated in the following table, which shows for each run the water entrainment in the air discharged through a gas-exit duct, expressed as percentages of the water feed rate.

| Inlet Velocity | Water Entrainment, Percent of Water Feed Rate | | |
| --- | --- | --- | --- |
| | 160 ft. per sec. | 220 ft. per sec. | 280 ft. per sec. |
| Model A | 3.85 | 9.05 | 14.31 |
| Model B | 0.85 | 3.45 | 7.79 |
| Model C | (¹) | 14.2 | (¹) |
| Model D | 0.50 | 1.20 | 4.78 |
| Model E | 0.83 | 2.74 | 10.3 |
| Model F | 1.01 | 1.66 | 5.21 |
| Model G | 1.02 | 1.76 | 2.87 |

¹ Not measured because visibly very large.

It is evident that all models except C showed significant improvements over Model A.

The improvement for Model B shows the effect of enlarging the bottom plate.

A comparison of Models B and C demonstrates the advantage of extending the closure vortex-breaker blades above the level of the plate.

Comparison of Models B and D indicates the advantage of providing the reverse inlet baffle.

Models E, F and G all had drains on the bottom plate. Comparison indicates the flat plate to be significantly superior to the conical plate of run E at the higher inlet velocities, while the provision of means in Model G for isolating the liquid which has drained into the funnel from the influence of the gas vortex led to the best results at the highest inlet velocities.

I claim as my invention:

1. A cyclone for separating suspended liquid from a gas comprising: an enclosing wall defining a centrifugation chamber; means for admitting a gas burdened with liquid with a rotary motion about the axis of said chamber to form a vortex therein; an overflow outlet for the discharge of gas at a central region of said chamber; an underflow outlet for the discharge of separated liquid from a part of said chamber beneath said overflow outlet; a bottom plate extending substantially horizontally between said overflow and underflow outlets, said plate and wall providing a passage for the downflow of liquid near the wall to the underflow outlet, said plate having a drain opening therein situated beneath said overflow outlet and spaced inwards from the margin of the plate; and a drain pipe connected to the said opening in the bottom plate and extending thence downwardly into the underflow outlet to discharge liquid from the top of the plate into said underflow outlet.

2. In combination with the cyclone according to claim 1, a vortex-breaker blade mounted immediately above the said opening in the bottom plate having radial and vertical dimensions which are less than one-third the diameter of the plate.

3. A cyclone according to claim 1, wherein said bottom plate is shaped to provide a substantially flat, annular outer portion and a funnel section fitted to said annular portion.

4. A cyclone according to claim 3, wherein said plate has a plate vortex-breaker vane in said funnel section and extending above said plate.

5. A cyclone according to claim 3, wherein said plate includes a closure extending over said funnel section and said closure has restricted inlet means to said funnel section.

6. A cyclone for separating suspended liquid from a gas comprising: an enclosing wall defining a centrifugation chamber; means for admitting a gas burdened with liquid with a rotary motion about the axis of said chamber to form a vortex therein; an overflow outlet for the discharge of gas at a central region of said chamber; an underflow outlet for the discharge of separated liquid from a part of said chamber beneath said overflow outlet; a bottom plate extending substantially horizontally between said overflow and underflow outlets, said plate and wall providing a passage for the downflow of liquid near the wall to the underflow outlet, said plate having a drain opening therein; a drain pipe connected to the said opening in the bottom plate and extending thence downwardly into the underflow outlet to discharge liquid from the top of the plate into said underflow outlet; and means for maintaining a liquid seal at the juncture of said drain pipe and the underflow outlet.

7. A cyclone for separating suspended liquid from a gas comprising: an enclosing wall defining a centrifugation chamber having an upright axis, at least the lower part of said wall being downwardly convergent to an underflow outlet opening for liquid at said axis; inlet means for admitting a gas burdened with liquid substantially tangentially to said enclosing wall at an upper level of the chamber; an overflow exit tube for gas of smaller diameter than said chamber extending coaxially therewith for the discharge of gas from the top of the chamber and having an open, downwardly directed intake end; a discharge conduit for separated liquid extending downwardly from said underflow outlet opening; a bottom plate extending substantially horizontally between said overflow exit tube and said underflow outlet opening within said downwardly-converging part of the enclosing wall and peripherally spaced therefrom, said plate having a diameter at least as great as that of the said underflow outlet opening and being formed with a substantially flat, annular outer portion, and a central drain opening; a drain pipe sealed to the plate at said drain opening and extending downwardly therefrom through the underflow outlet opening and into said discharge conduit for feeding liquid from the plate into said conduit; and means for maintaining a liquid seal within said conduit about the lower end of said drain pipe.

8. In combination with the cyclone according to claim 7, a plurality of vortex-breaker blades fixed within said downwardly-convergent part of the enclosing wall beneath said bottom plate.

9. A cyclone according to claim 8, wherein said vortex-breaker blades extend radially beyond the periphery of said bottom plate and upwardly along the said enclosing wall to a level above said bottom plate.

10. In combination with the cyclone according to claim 7, a plate vortex-breaker vane at the central part of the bottom plate extending immediately above said drain opening.

11. A cyclone for separating suspended liquid from a gas comprising: an enclosing wall defining a centrifugation chamber having an upright axis, at least the lower part of said wall being downwardly convergent toward said axis and having an underflow outlet opening at the bottom; inlet means for admitting a gas burdened with liquid substantially tangentially to said enclosing wall at an upper level of the chamber; an overflow exit tube for gas of smaller diameter than said chamber extending coaxially therewith for the discharge of gas from the top of the chamber and having an open, downwardly directed intake end; a discharge conduit for separated liquid extending downwardly from said underflow outlet opening; a bottom plate extending substantially horizontally between said overflow exit tube and said underflow outlet opening within said downwardly-convergent part of the enclosing wall and peripherally spaced therefrom; and a plurality of vortex-breaker blades fixed within said downwardly-convergent part of the enclosing wall beneath said bottom plate and extending outwardly beyond the periphery of said bottom plate and upwardly along said enclosing wall to a level above said bottom plate.

12. A cyclone according to claim 11, wherein said vortex-breaker blades are in vertically spaced relation beneath the central part of said bottom plate for the major part of the diameter thereof.

References Cited in the file of this patent

UNITED STATES PATENTS

| | | |
|---|---|---|
| 522,769 | Thompson et al. | July 10, 1894 |
| 2,010,435 | Matheson | Aug. 6, 1935 |
| 2,157,305 | Raymond | May 9, 1939 |
| 2,214,658 | Browning | Sept. 10, 1940 |
| 2,489,903 | Kraft et al. | Nov. 29, 1949 |